United States Patent [19]

Ohba et al.

[11] Patent Number: 4,763,143

[45] Date of Patent: Aug. 9, 1988

[54] ELECTROGRAPHIC RECORDING APPARATUS

[75] Inventors: Sayoko Ohba; Kenji Okuna; Hidefumi Ohtsuka, all of Ibaraki, Japan

[73] Assignee: Hitachi, Ltd., Tokyo, Japan

[21] Appl. No.: 63,113

[22] Filed: Jun. 17, 1987

[30] Foreign Application Priority Data

Jun. 18, 1986 [JP] Japan ............................... 61-140111

[51] Int. Cl.$^4$ ............................................ G01D 15/00

[52] U.S. Cl. ............................... 346/160.1; 346/153.1

[58] Field of Search .................. 346/150, 153.1, 160.1, 346/155, 74.2, 74.3, 74.5; 358/301, 300; 355/3 DD; 400/119; 101/DIG. 13, DIG. 5

[56] References Cited

U.S. PATENT DOCUMENTS 3,816,840 6/1982 Kotz .................................. 346/74.2

4,464,672 8/1984 Lindahl ........................... 346/153.1

*Primary Examiner*—Arthur G. Evans

*Attorney, Agent, or Firm*—Antonelli, Terry & Wands

[57] ABSTRACT

Electromagnetic toner is supplied to the surface of the image development drum formed of a hollow aluminum covered with electric insulation; a permanent magnet is installed in the hollow portion of the image development drum; a recording electrode is provided on the surface side of the image development drum with a small gap formed between the drum surface and the electrode; a voltage is applied between the recording electrode and the image development drum according to the image to be recorded; the image development drum is turned to form a toner image on its surface; and the toner image formed on the drum surface is then transferred onto a recording sheet.

12 Claims, 7 Drawing Sheets

ELECTROGRAPHIC RECORDING APPARATUS

BACKGROUND OF THE INVENTION

1. Field of the Invention

This invention relates an electrographic recording apparatus and more particularly to the one which records images on a recording body by using electromagnetic toner.

2. Prior Art

In conventional electrographic recording apparatuses, such as disclosed in the Japanese Patent Application Publication No. 50557/1983, electromagnetic toner is stored in a hopper; a member to carry the toner is installed under the hopper and is moved with respect to the hopper; a number of independent electrodes are arranged along the width of the toner carrier member downstream of the toner carrier member; a magnetic field is generated to prevent the toner from flowing out from the electrodes at all times; the electrodes are applied with voltage to weaken the toner blocking force produced by the magnetic field so as to allow the toner to flow out onto the toner carrier member and thereby form a toner image. This method has an advantage of being able to use dry toner and to form an image directly on the toner carrier member with low voltages.

However, with this method, if perfect control is to be made of electromagnetic toner flow at the electrode, a magnet of the magnetic field generating means is required to be installed somewhat closer to the toner hopper away from the electrode end along the toner carrying direction.

When the magnet of the magnetic field generating means is located near the toner hopper, the magnetic flux produced by the magnetic field generating means does not necessarily concentrate on the electrode. This is not satisfactory for stably forming toner chains between the toner carrier member and the electrode. If the magnetic field is intensified to ensure stable formation of toner chains, this gives rise to another problem, i.e., the toner blocking force will become very strong preventing stable supply of toner to the recording area where the toner chains are formed.

Another example of conventional electrographic recording using electromagnetic toner is disclosed in U.S. Pat. No. 3,816,840.

The process and equipment described in the U.S. publication may be summarized as follows: a first drum electrode incorporating a magnet roll carries electromagnetic toner to the recording area where a large number of toner chains are formed; and a current is supplied to the toner chain electric circuits to produce a force opposing the upward force generated by the magnet roll and thereby form an image in the recording area.

With this technique, however, there are many toner chains formed in the recording area by the magnet roll's field and a current is commonly supplied to the electric circuits of the toner chains (the electric current corresponds to each of the elements of the image to be formed). Thus, supply of current to many toner chains results in many toner particles adhering to the recording member, making it difficult to produce an image in strict accordance with image signals. Especially when it is desired to increase the recording density of image to obtain high-quality image recording, this technique can hardly be said to be practical.

SUMMARY OF THE INVENTION

The objective of this invention is to provide an electrographic recording apparatus capable of substantially improving the recorded image quality.

Another objective of this invention is to provide an electrographic recording apparatus which produces images of high-resolution with low recording voltages.

The electrographic recording apparatus of this invention comprises:

a movable recording body having a recording surface, the recording surface being formed of an insulated layer;

a large number of recording electrodes arranged along the width of the recording body, the electrodes being spaced at one end from the recording surface of the recording body to provide a fine gap between them;

a toner supply section for supplying the electromagnetic toner continuously to the gap from upstream with respect to the direction of movement of the recording body;

a magnetic field generating means located on a side of the recording body opposite to the recording side to form toner chains in the gap; and a voltage application means to apply voltage to the electrodes according to the image to be developed;

whereby the end of the recording electrodes is located upstream, with respect to the direction of movement of the recording body, of the intersection between the recording body and a line connecting the poles of the magnetic field generating means and also downstream of the intersection between the recording body and a line perpendicular to the first line and passing through the center of the magnetic field generating means.

Other objects and features of this invention will become apparent in the following description. dr

DESCRIPTION OF THE PREFERRED EMBODIMENT

By referring to preferred embodiments, the invention will be described in detail in the following.

Figure 1:
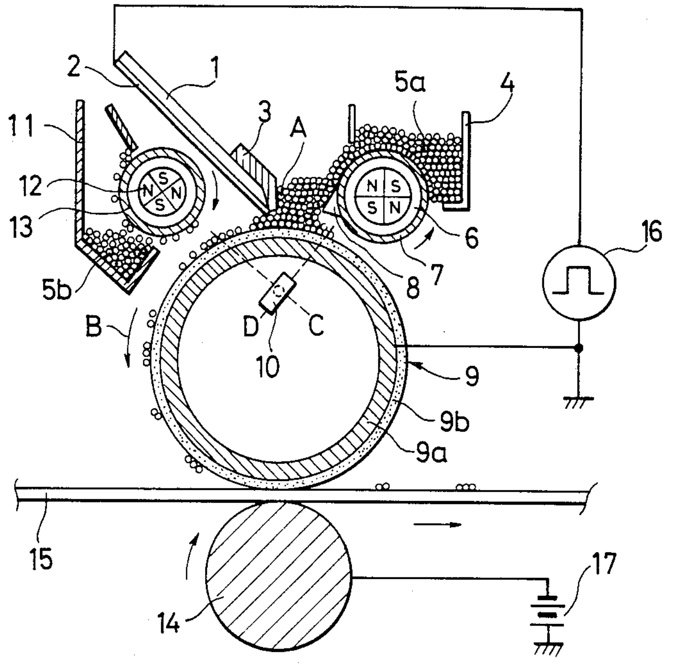
FIG. 1 is a cross-sectional view showing one embodiment of this invention.

FIG. 1 shows one embodiment of this invention. In this figure, a number of recording electrodes 2 are mounted on a substrate 1 (for instance, ceramic substrate) by the thick-film process and arranged across the recording body. The substrate 1 has its end on the recording side tapered off. On the side opposite to the electrode, the substrate 1 has a magnetic plate 3 made of magnetic material to effectively concentrate the magnetic flux at the end of the electrode. A hopper 4 containing the electromagnetic toner (hereinafter referred to simply as toner) 5*a* is provided upstream of the substrate 1 with respect to the moving direction B of the recording body 9. Under the hopper 4 are provided a magnet roll 6 with N-pole and S-pole alternately arranged, a first sleeve 7 put around the magnetic roll 6, and a second sleeve 8 projecting from the first sleeve 7 toward the substrate 1.

As the magnet roll 6 rotates, the toner 5*a* in the hopper 4 is supplied continuously through the gap between the hopper 4 and the first sleeve 6 and to the second sleeve 8 and then to the gap A between the recording body 9 and the end of the recording electrode 2.

The recording body (image developing drum) 9 is a hollow circular cylinder movable in the direction of arrow B. The recording body 9 consists of a conductive part 9*a* and an insulating layer 9*b* 2 to 100 micron thick with its surface finely finished like a mirror. As for the material of the recording body 9, aluminum is used as a base material with its surface anode-oxidized to form a protective layer. Or porous hard aluminum oxide is impregnated with polytetrafluoroethylene to form an insulating layer 9*b*. The insulating layer surface of the recording body 9 constitutes a recording surface to which the toner adheres for recording an image.

Figure 2:
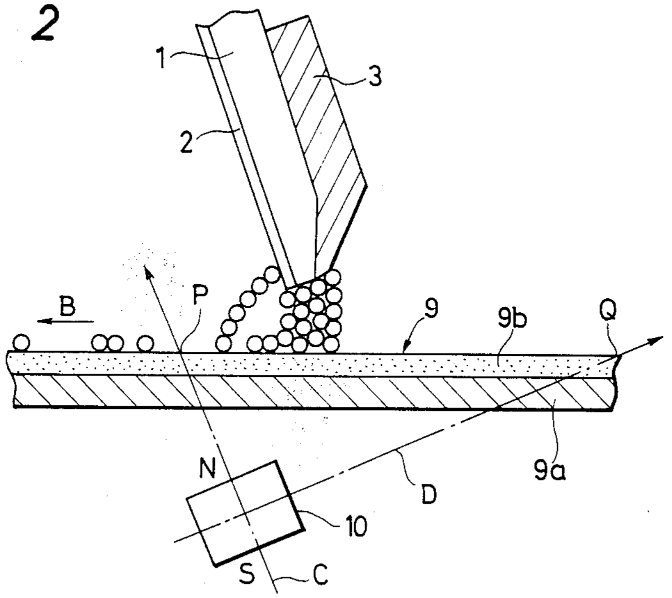
FIG. 2 is a partial enlarged view of FIG. 1.

Inside the recording body 9 (in a hollow portion) is installed a permanent magnet 10 to produce a magnetic field. The magnetic flux generated by this magnet 10 forms toner chains between the recording surface (surface of the insulating layer 9*b*) of the recording body 9 and the end of the recording electrode 2. The relationship in position between the magnet 10 and the recording electrode 2, as shown enlarged in FIG. 2, is such that the end of the electrode 2 is located upstream of a point P—an intersection between the recording body 9 and the line C connecting the poles—with respect to the direction of recording body movement and that it is located downstream of a point Q—an intersection of the line D running perpendicular to the line C through the center between the poles—with respect to the direction of movement of the recording body 9.

Denoted 11 is a hopper to recover excess toner 5*b*; 12 a magnet roll; 13 a sleeve. The hopper, magnet roll and sleeve form an excess toner recovering means. Further downstream of the excess toner recovering means for the recording body 9 is provided a conductive rubber roller 14 with a recording sheet (such as paper) inserted between the recording body 9 and the roller 14.

A drive circuit 16 is provided as a means to apply voltage to record the image on the recording body 9. This circuit applies voltage, according to the image to be developed, between the recording electrode 2 and the conductive part of the recording body 9. A power supply 17 is connected to the conductive rubber roller 14 to transfer the recorded image of toner adhering to the recording body 9 onto the recording paper 15. The toner transferred onto the recording paper 15 is then fixed by pressure and heat.

Next, the action of the above embodiment will be explained in detail.

The toner 5*a* in the hopper 4 is carried by sleeves 7, 9 as the magnet roll 6 turns and further carried to the recording area A. Excess toner 5*a* is attracted by the magnet roll 6 onto the sleeve 7 to be recovered into the hopper 4 as the magnet roll 6 rotates. The toner 5*a* thus supplied to the recording area A forms toner chains filling the gap between the end of the electrode 2 and the recording surface of the recording body 9.

Figure 3:
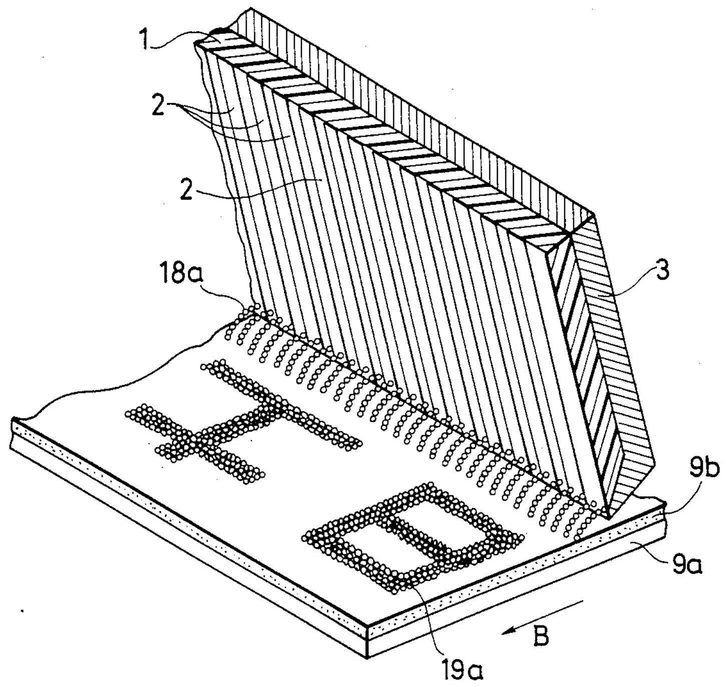
FIG. 3 shows the action of a developing section.

FIG. 3 shows the toner chains 18*a* and the electrodes 2, and also the developed image 19*a* being formed on the recording body 9. With the permanent magnet 10, the voltage application means and the recording body arranged as mentioned earlier, the toner chains 18*a*, as shown in FIG. 3, have their ends orderly lined on the recording body 9, maintaining the chain form at all times irrespective of the shape of the letter to be developed. Since the electrode 2 is inclined toward the direction of movement of the recording body so as to keep its side in contact with the toner chains, a large contact area between the electrode and the toner chains can be obtained even when the resolution of the electrode 2 is increased.

Figure 9:
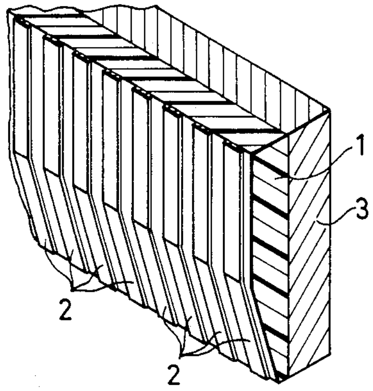
FIGS. 9 and 10 show example structures of the recording electrodes.
Figure 10:
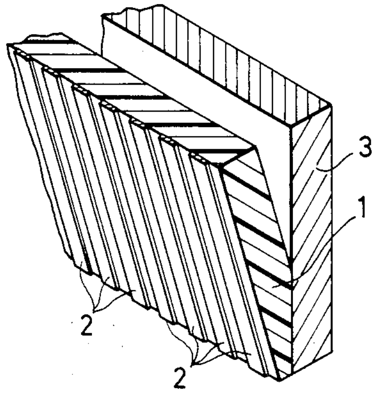

As another example of inclining the electrode 2 toward the recording body moving direction, the electrode may be arranged as shown in FIGS. 9 and 10. That is, in FIG. 9 or 10, the ceramic substrate 1 is machined to give an inclined surface on which the recording electrodes 2 are formed. This virtually inclines the recording electrodes 2 toward the direction of movement of the recording body.

Now, returning to FIG. 1, as the drive circuit 16 applies voltages to a plurality of recording electrodes 2 according to the image signals, the toner particles in the chain in contact with the recording surface are charged by electricity that flows through the toner chain 18*a* in contact with the energized electrode. At the same time, at the boundary between the conductive part 9*a* and the insulating part 9*b* of the recording body 9 is induced a charge of opposite polarity to the toner charge. These two opposite charges attract each other by the coulomb force. Thus, as the recording body 9 turns in the direction of the arrow B, the charged toner particles are separated from the toner chain 18*a*, forming a developed image 19*a* as shown in FIG. 3. The toner chain which had its toner particle at the lower end broken off is given a new toner particle which is supplied from the other side of the substrate opposite to the electrode by the toner supplying means as the recording body 9 moves, thereby immediately recovering the toner chain 18*a*.

When the recording body 9 is turned, a part of the toner though not charged trails along with the developed image 19*a* in the direction of movement of the recording body 9. This excess toner, since it is not attracted to the recording body 9 by the coulomb force, can selectively be attracted by the magnetic force of the magnet roll 12 and recovered into the hopper 11 as the magnet roll 12 turns. Thus, the recording body 9 is cleared of excess toner. The developed image removed of excess toner is transferred onto the recording paper 15 by electric force and mechanical contact, the electric force being generated by applying voltage of a polarity opposite to the toner to the conductive rubber roller 14. The transferred image is then fixed on the paper by a fixing apparatus (not shown) to produce a permanent image.

On the other hand, where the magnet 10, the voltage applying means, and the recording body are not arranged as mentioned earlier, the toner chains are not uniform in length and the positions where the ends of the toner chains contact the recording body 9 are not in line but waved. They are also affected by the shape of the letter to be developed. Where there is a series of blank areas, the amount of toner becomes excessive forming long toner chains, whereas at locations where there are successive black letters the toner chains tend to be short. This unstable formation of toner chains results in disturbance of the developed image.

Figure 4:
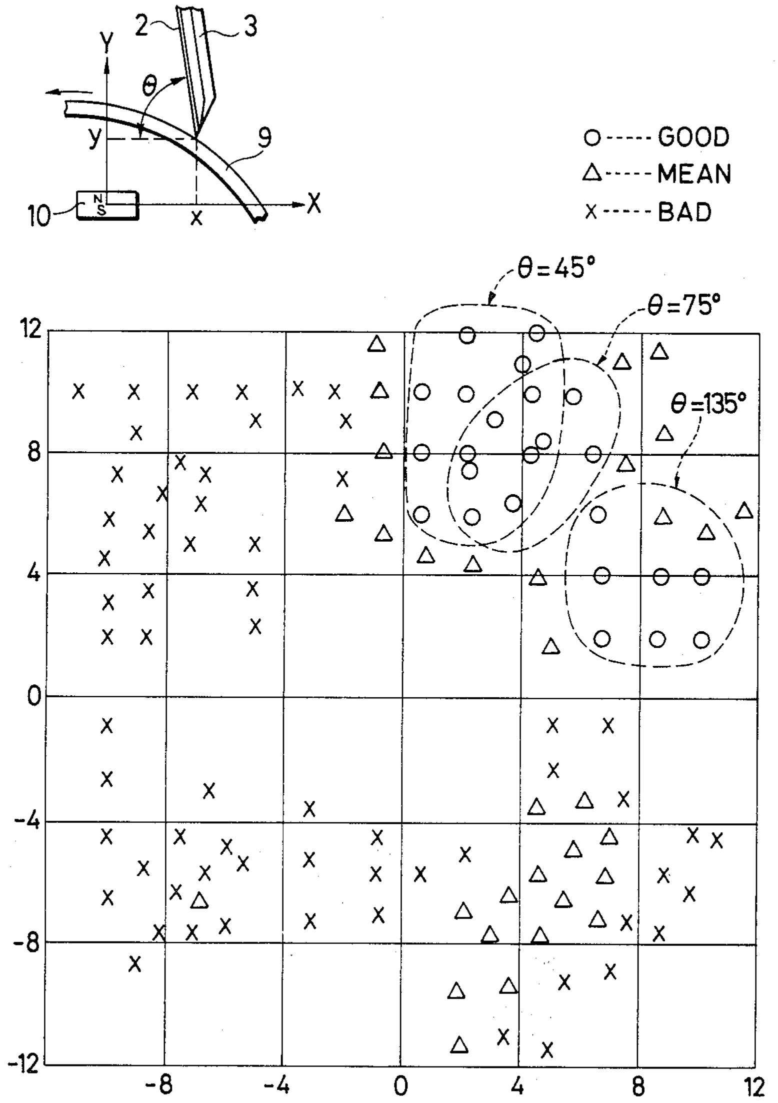
FIG. 4 shows the picture quality versus the relationship between the recording electrodes and the magnet.

FIG. 4 shows the result of experiment with the position of recording electrode changed with respect to the magnet. The magnet used was "Hicolex 18B," a trade name of a magnet of Hitachi Kinzoku K.K. make, and the toner used was a one-component toner P443-2 of Hitachi Kinzoku K.K. make. The recording body 9 was an aluminum pipe 40 mm in diameter with a hard film 10 micron thick formed on its surface by anode-oxidization. The electrodes with the density of 12 electrodes/mm were formed on the substrate by the thick-film process.

In FIG. 4, it is seen that high-quality images are obtained in the area where both x and y values are positive. That is, high-quality images result when an arrangement is made such that the end of the recording electrode is located upstream, with respect to the recording body movement direction, of the intersection between the recording body and the line connecting the magnet poles (i.e., y axis) and that the intersection between the recording body and the line (x axis) perpendicular to the former line and passing through the magnet center between the poles is located downstream of the electrode end. Areas in the graph near and far from the origin, although x and y are positive, do not produce high-quality images. This is because in the area close to the origin where the electrode is near the magnet, the magnetic flux density is very high producing toner chains each which has toner particles bound together with too strong a magnetic force to separate toner particles from the chain, with a result that a desired image fails to be developed. On the other hand, in areas remote from the origin the flux density is too low to produce stable toner chains. As a result high-quality images cannot be obtained. The location of the area with positive X and Y values where high-quality images cannot be obtained changes depending on to what extent the toner is magnetized.

Figure 5:
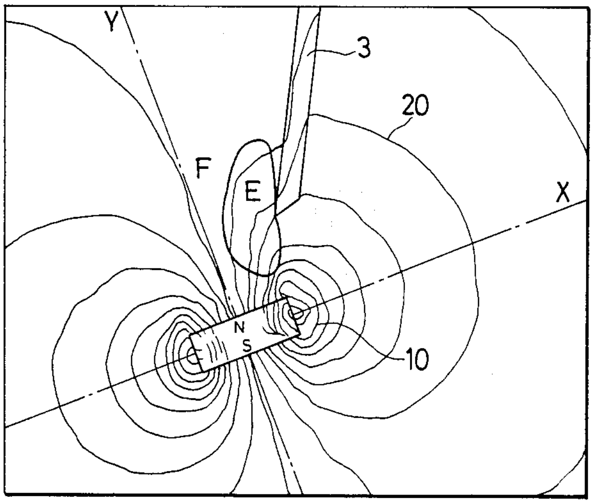
FIG. 5 shows a magnetic field distribution of the first embodiment of this invention.

The reason that the above arrangement of the recording electrode end, the recording body and the magnet enables stable formation of toner chains between the recording body and the voltage application means and therefore high-quality images is explained in more detail by referring to FIG. 5.

FIG. 5 shows the result of analysis, by a finite element method, of the magnetic field generated between the magnet and the magnetic plate of the voltage application means. In the figure, denoted 3 is a magnetic plate, 10 a magnet, and 20 magnetic lines of force, y a line connecting the magnet poles, and x a line perpendicular to the line y and passing the center of the magnet.

Where the end of the magnetic plate of the voltage application means is located in the area to the right of the line y and above the line x, the magnetic lines of force concentrate in the area E in which the density of flux is high, whereas the adjacent area F has a low flux density. Therefore, the toner in the area E will stably form toner chains along the concentrated magnetic flux. If the electrode is located where the magnetic flux enters the magnetic plate and if the recording body is arranged so that it crosses the flux, then stable formation of toner chains between the magnetic plate and the recording body is assured at all times.

Since the magnetic lines of flux is dense in the area E and sparse in the area F, the toner chains formed along the flux at the boundary between these two areas E and F remain always in the same positions. Further, if the image developed by the toner chains in the area E is made to enter, immediately after development, into the area F where the flux density is low, the developed image is prevented from being disturbed. Since the recording body is recorded at the area E and moves to the area F, a high-quality image is obtained.

Figure 6:
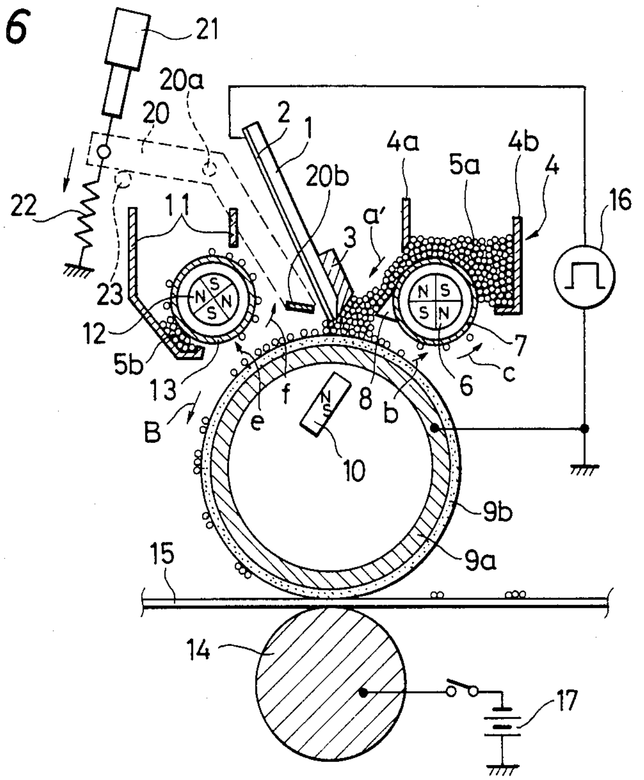
FIG. 6 through FIG. 8 show another embodiment of this invention.
Figure 7:
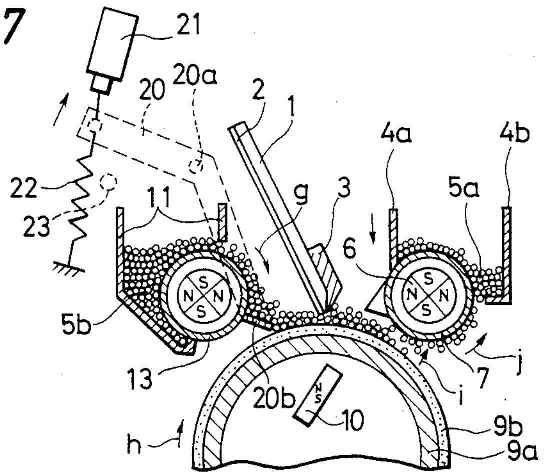

Next, another embodiment of this invention will be described. FIGS. 6 and 7 show another embodiment of the invention, and members with the same reference numerals as those in the previous embodiment are identical with those of the previous embodiment. This embodiment is provided with a function of transferring the excess toner **5*b* recovered in the hopper 11 to the hopper 4 of the toner supply means. A toner recovery auxiliary device 20 is provided to supply the excess toner 5*b* from the sleeve 13 onto the recording body 9. The device 20 is pivotably mounted at one point by a pin 20*a* with one end supported by an electromagnetic solenoid 21 and a spring 22, both being arranged on the opposite sides. The device 20 has a toner guide 20*b*** on the other end.

During image recording, the solenoid 21 is not applied with voltage from the driving section (not shown). At that time, the excess toner auxiliary device 20 is rotated to the stopper 23 with the toner guide **20*b* kept out of contact with the recording electrode 2 and the recording body 9, as shown in FIG. 6. In this condition, an image is recorded on the recording body 9. The action of image recording is the same as in the previous embodiment of FIG. 1** and thus its explanation is omitted.

Figure 8:
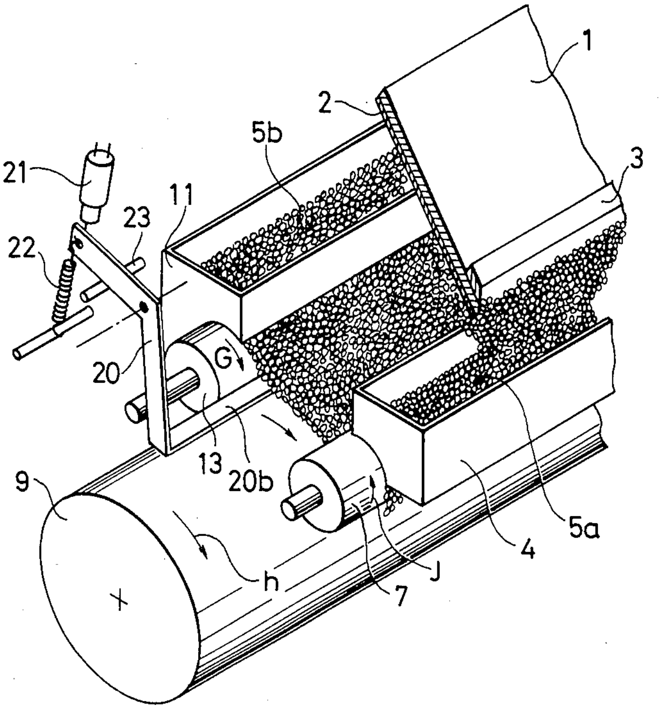

Next, we will explain how the excess toner **5*b* recovered in the hopper 11 is transferred to the supply side. When the toner in the hopper 11 reaches a specified value, or when the amount of recording reaches a specified amount, or during idle condition in which no recording is made, the toner 5*b* is returned to the hopper 4 on the supply side. That is, as shown in FIGS. 7 and 8, the solenoid 21 is energized to rotate the device 20 against the spring force. As a result the toner guide 20 comes into contact with the sleeve 13. In this condition, the magnet roll 12 is reversed from the turning direction of FIG. 6. This causes the toner 5*b* to move in the direction of g over the toner guide 20*b* and then onto the recording body 9. At this time, the recording body 9 is made to turn in the direction h opposite to the direction of FIG. 6. Then the toner 5*b* is carried in the direction opposite to the one when image recording is performed and further carried to the sleeve 7 located under the hopper 4** on the toner supply side.

As the shutter **4*a* of the hopper 4 is closed, no toner is supplied and the toner 5*b* on the recording body is attracted by the magnet roll 6 to move in the directions i and j and then is recovered into the hopper 4. With this embodiment it is possible to easily and reliably recover the toner without having to providing a complex toner recovering means. The magnet 10 to form the toner chains may preferably be moved away from the electrode 2 during toner recovery process for better efficiency. When the magnet 10** is an electromagnet, the current has only to be turned off.

In the apparatus of FIG. 1, it is desired that as many toner particles as possible be supplied onto the development drum to get a clear transferred image on the recording paper.

Figure 11:
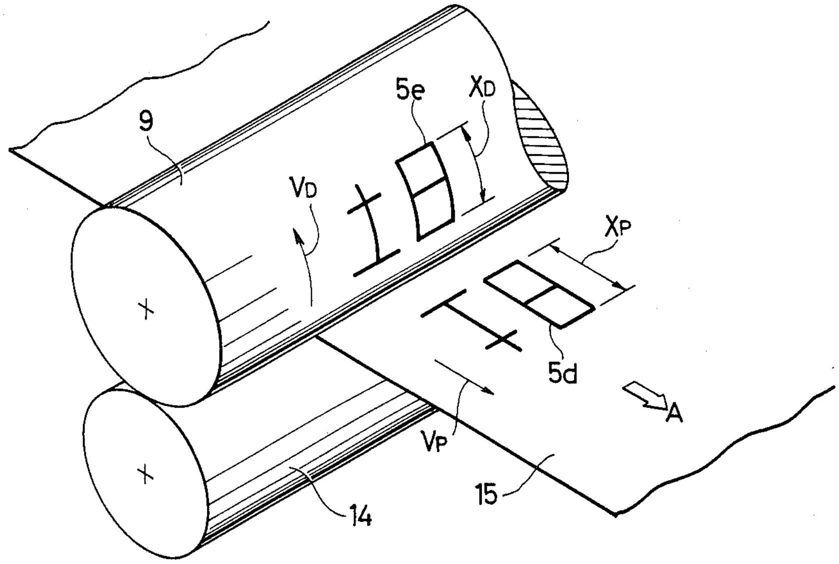
FIG. 11 shows the method of effectively transferring the toner onto the recording paper.

FIG. 11 shows the image transfer section of the electrographic recording apparatus of FIG. 1. This is a perspective view with the recording electrode 1 and hopper 4 removed, as seen from the recording paper outlet side of the image development drum. In FIG. 11, denoted 9 is an image development drum, 14 a transfer roller, 15 a sheet of recording paper, 5*d* a transferred toner image, and 5*e* a residual toner image. The recording paper 15 is fed in the direction of arrow A as the image development drum 9 and the transfer roller 14 rotate. The circumferential speed of the drum 9 is set at VD and the recording paper feeding speed at VP. Thus, the height of the characters on the transferred image and the residual image has the following relationship.

$$VP/VD = XP/XD$$

Since VD is set greater than VP (VD>VP), the character height XP on the recording paper is relatively smaller than the character height XD on the drum, with the result that the height of the characters on the recording paper is reduced. This problem, however, can be eliminated by setting the character height XD on the drum large enough to get a desired character height XP on the recording paper. That is, in recording the image by the recording electrode, the toner image on the drum is formed longer by the amount corresponding to the velocity ratio.

In the apparatus of FIG. 1, the feed speed of the recording paper 15 may be controlled so that the circumferential velocity VD of the drum 9 is larger than the feed velocity VP of the recording paper 15, by restricting the paper feed with carrier rollers which introduce the paper to the transfer roller. In other words, the carrier rollers brake down the paper feed causing a slip between the image development drum and the recording paper. Other braking means than the carrier rollers may also be achieved by an appropriate pressing means and tension means.

Figure 12:
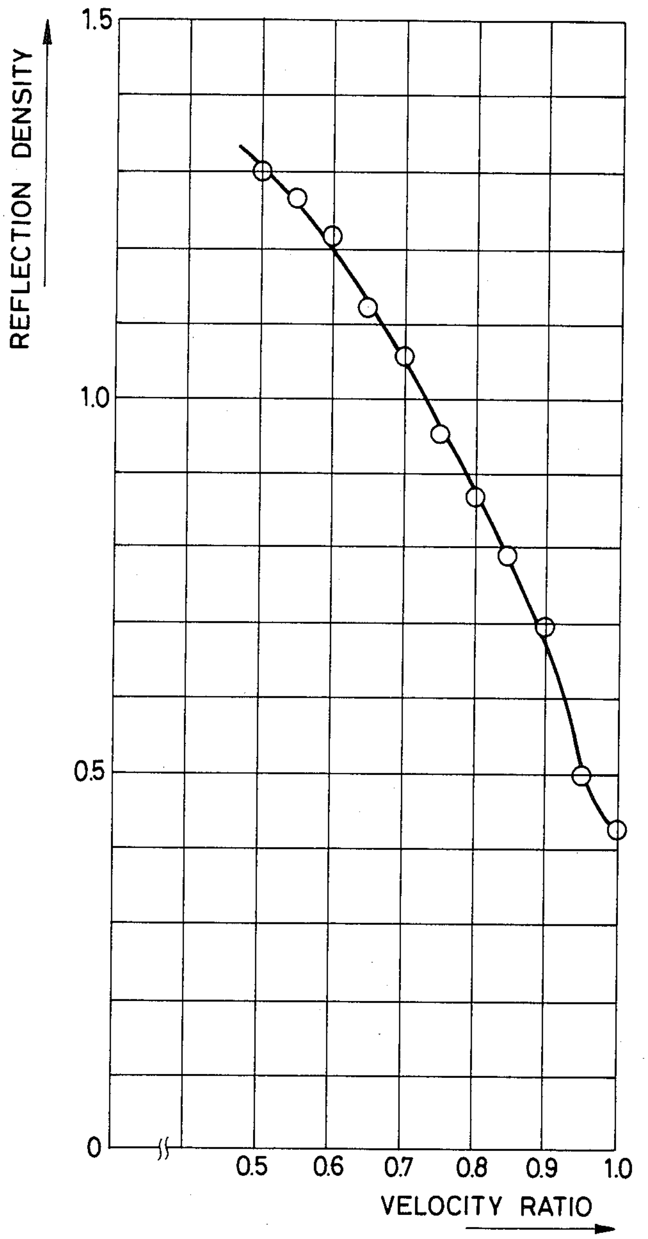
FIG. 12 shows the effects brought about by the method of FIG. 11.

FIG. 12 shows the reflection density of the recording paper in relation to the speed ratio of the recording paper feed velocity VP and the development drum circumferential velocity VD. As the recording paper speed VP decreases from the drum circumferential speed VD, the reflection density of the toner image on the recording paper increases.

Figure 13:
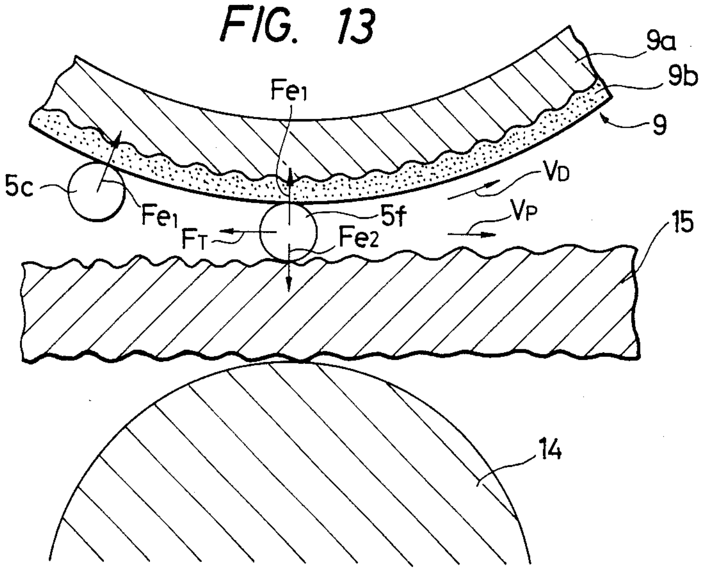
FIG. 13 shows the operational principle of the method as shown in FIG. 11.

The cause of this phenomenon is considered by using FIG. 13. FIG. 13 shows a partial enlarged view of the image transfer section of the apparatus as shown in FIG. 1. The developed toner particle 5*c* adheres to the image development drum 9 by the first electric force Fe1. As the drum 9 rotates and the toner particle is carried onto the recording paper, it is acted upon by a mechanical shearing force FT generated by the velocity difference between the image development drum speed VD and the paper feed speed VP. When due to the shearing force FT the toner particle is shifted from the original point on the drum, the first electric force Fe1 rapidly reduces allowing the toner particle 5*f* to be transferred onto the recording paper even if the second electric force Fe2 is set low. This increases the efficiency of toner transfer onto the recording paper.

As explained above, with this invention it is possible to stably form toner chains between the recording body and the recording electrode, reliably charge the toner which is in contact with the recording body by applying voltage to the toner chains, and thereby substantially improve the quality of the images.

We claim:

1. An electrographic recording apparatus comprising:

a movable recording body having a recording surface to which electromagnetic toner adheres, the recording surface being an insulated layer;

a recording electrode having a non-moving end spaced from the recording surface of the recording body to provide a fine gap between the electrode and the recording surface;

a toner supply means for supplying the electromagnetic toner continuously to the gap between the moving recording body and the non-moving end of the recording electrode;

a magnetic field generating means located on a side of the recording body opposite to the recording surface to form toner chains made up of electromagnetic toner particles in the gap; and a voltage application means to apply voltage to the recording electrode according to the image to be developed;

whereby the non-moving end of the recording electrode is located upstream, with respect to the direction of movement of the recording body, of the intersection between the recording body and a line connecting the poles of the magnetic field generating means and also downstream of the intersection between the recording body and a line running perpendicular to the first line through the center of the magnetic field generating means.

2. An electrographic recording apparatus as set forth in claim 1, wherein the recording electrode is inclined toward downstream with respect to the direction of movement of the recording body.

3. An electrographic recording apparatus as set forth in claim 1, wherein the recording electrode is mounted on a substrate formed of insulating material on the downstream side with respect to the direction of movement of the recording body and a magnetic plate is mounted on the other side of the substrate opposite to the side where the recording electrode is mounted.

4. An electrographic recording apparatus as set forth in claim 3, wherein the substrate is inclined toward downstream with respect to the direction of movement of the recording body.

5. An electrographic recording apparatus as set forth in claim 1, wherein an excess toner recovering means is provided downstream of the recording electrode with respect to the direction of movement of the recording body.

6. An electrographic recording apparatus as set forth in claim 1, wherein said recording sheet to which a developed image on the recording body is to be transferred is made to come into contact with the recording body at a point downstream of the recording area with respect to the direction of movement of the recording body and an image transfer section is provided which has the feed velocity VP of the recording sheet smaller than the moving velocity VD of the recording body.

7. An electrographic recording apparatus comprising:

a rotatable image development drum having an outer recording surface, the recording surface being an insulating layer to which electromagnetic toner attaches;

a large number of recording electrodes arranged along the length of the image development drum at a fixed peripheral position relative to the drum, the recording electrodes having one end spaced from the recording surface to form a small gap between the recording electrode ends and the recording surface;

a magnetic field generating means arranged inside the image development drum in a position opposite the recording electrodes;

a voltage application means to apply voltage to the recording electrodes to the image to be recorded;

a toner supplying section to supply electromagnetic toner to the upstream side of the recording electrodes with respect to the turning direction of the image development drum; and an excess toner recovering section installed downstream of the recording electrodes with respect to the turning direction of the image development drum to remove excess toner adhering to the recording surface of the image development drum.

8. An electrographic recording apparatus as set forth in claim 7, wherein the recording electrodes are inclined toward downstream with respect to the turning direction of the image development drum.

9. An electrographic recording apparatus as set forth in claim 7, wherein the recording electrodes are mounted on a substrate formed of insulating material on the downstream side with respect to the turning direction of the image development drum and a magnetic plate is mounted on the other side of the substrate opposite to the side where the recording electrodes are mounted.

10. An electrographic recording apparatus as set forth in claim 9, wherein the substrate is inclined toward downstream with respect to the turning direction of the image development drum.

11. An electrographic recording apparatus as set forth in claim 7, wherein said recording sheet to which an image developed on the recording surface of the image development drum is to be transferred is made to come into contact with the recording surface at a point downstream of the excess toner recovering section with respect to the turning direction of the image development drum and an image transfer section is provided which has the feed velocity VP of the recording sheet smaller than the moving velocity VD of the image development drum.

12. An electrographic recording apparatus comprising:

a rotatable hollow image development drum having a recording surface, the recording surface being an insulating layer to which electromagnetic toner attaches;

a large number of recording electrodes arranged along the length of the image development drum, the recording electrodes having one end spaced from the recording surface to form a small gap between the recording electrodes ends and the moving recording surface;

a magnetic field generating means arranged inside the image development drum at a position opposite the recording electrodes;

a voltage application means to apply voltage to the recording electrodes according to the image to be recorded;

a toner supplying section to supply electromagnetic toner to the upstream side of the recording electrodes with respect to the turning direction of the image development drum;

an excess toner recovering section installed downstream of the recording electrodes with respect to the turning direction of the image development drum to remove excess toner adhering to the recording surface of the image development drum; and an image transfer section provided downstream of the excess toner recovering section with respect to the turning direction of the image development drum to transfer a toner image formed on the recording surface of the image development drum onto a recording sheet.

* * * * *